United States Patent
Thoen et al.

[15] 3,690,047
[45] Sept. 12, 1972

[54] COMBINATION LAWN MOWING AND SNOW THROWING MACHINE

[72] Inventors: Roy M. Thoen, 1313 Marsh St.; Leander Kassuelke, 820 Sherman, both of Mankato, Minn. 56001

[22] Filed: Sept. 21, 1971

[21] Appl. No.: 182,372

[52] U.S. Cl. ............56/13.3, 56/249, 56/294, 37/43 L
[51] Int. Cl. ............................A01d 35/24
[58] Field of Search ........37/43 R, 43 A, 43 B, 43 D, 37/43 G, 43 L; 56/249–254, 294, 16.7, 16.9, 13.4, 13.3

[56] References Cited

UNITED STATES PATENTS

| | | | |
|---|---|---|---|
| 2,066,207 | 12/1936 | Lestina | 37/43 R |
| 2,282,238 | 5/1942 | Newton | 56/252 |
| 2,484,071 | 10/1949 | Brauer | 56/252 |
| 2,533,691 | 12/1950 | Remonte | 56/249 |
| 2,772,533 | 12/1956 | Shibley, Jr. | 56/252 |
| 3,466,767 | 9/1969 | Rubin | 37/43 R |

FOREIGN PATENTS OR APPLICATIONS

| | | | |
|---|---|---|---|
| 818,810 | 10/1951 | Germany | 37/43 B |

*Primary Examiner*—Russell R. Kinsey
*Attorney*—Carlsen, Carlsen & Sturm

[57] ABSTRACT

A combination lawn mower and snow blower wherein a rotary impeller member has a series of spaced disks axially mounted in spaced parallelism along a shaft with the disks being disposed at a substantially 45° angle to the shaft axis with diametrically opposing cutter bars mounted to extend along the disk peripheries which are closest to the shaft so that during rotation of the member, the bars will cut through snow or grass and the disks will move the material rearwardly under the shaft for upward ejection through a beater housing.

6 Claims, 4 Drawing Figures

PATENTED SEP 12 1972 3,690,047

INVENTOR.
ROY M. THOEN
BY LEANDER KASSUELKE
Carlsen, Carlsen & Sturm
ATTORNEYS

INVENTOR.
ROY M. THOEN
LEANDER KASSUELKE

ATTORNEYS

COMBINATION LAWN MOWING AND SNOW THROWING MACHINE

BACKGROUND OF THE INVENTION

Power operated machines for effectively mowing grass and for removing snow from walks, roadways and the like are in common use. Moreover, there are various residential size units which may be used for both purposes. However, such units generally require a modification of the machine, such as the substitution of one attachment for another, to convert it for effective performance between its lawn mowing and snow removal functions. This is due to the fact that a tool has not been developed which will effectively both collect snow and mow grass and deliver these materials to a discharge means without structural modification.

SUMMARY OF THE INVENTION

It is accordingly an object of the invention to provide a power tool which will effectively both mow grass on and remove snow from a ground surface without mechanical modification.

With this and other objects in view, the invention broadly comprises a wheeled implement having a power means, a forwardly opening impeller housing and a beater housing connected to the impeller housing and containing a beater driven by the power means for discharging materials conveyed thereto from the impeller housing, and a rotary impeller in the impeller housing comprising a shaft mounted for rotation therein with a plurality of disks mounted in tilted relation thereon to form a wobble plate impeller for moving material to the beater housing, and a pair of cutter bars mounted in diametrically opposing positions to extend across the most tilted edges of the disks to cut into grass or snow as it enters the impeller housing.

DESCRIPTION OF THE PREFERRED EMBODIMENT

Figure 1:
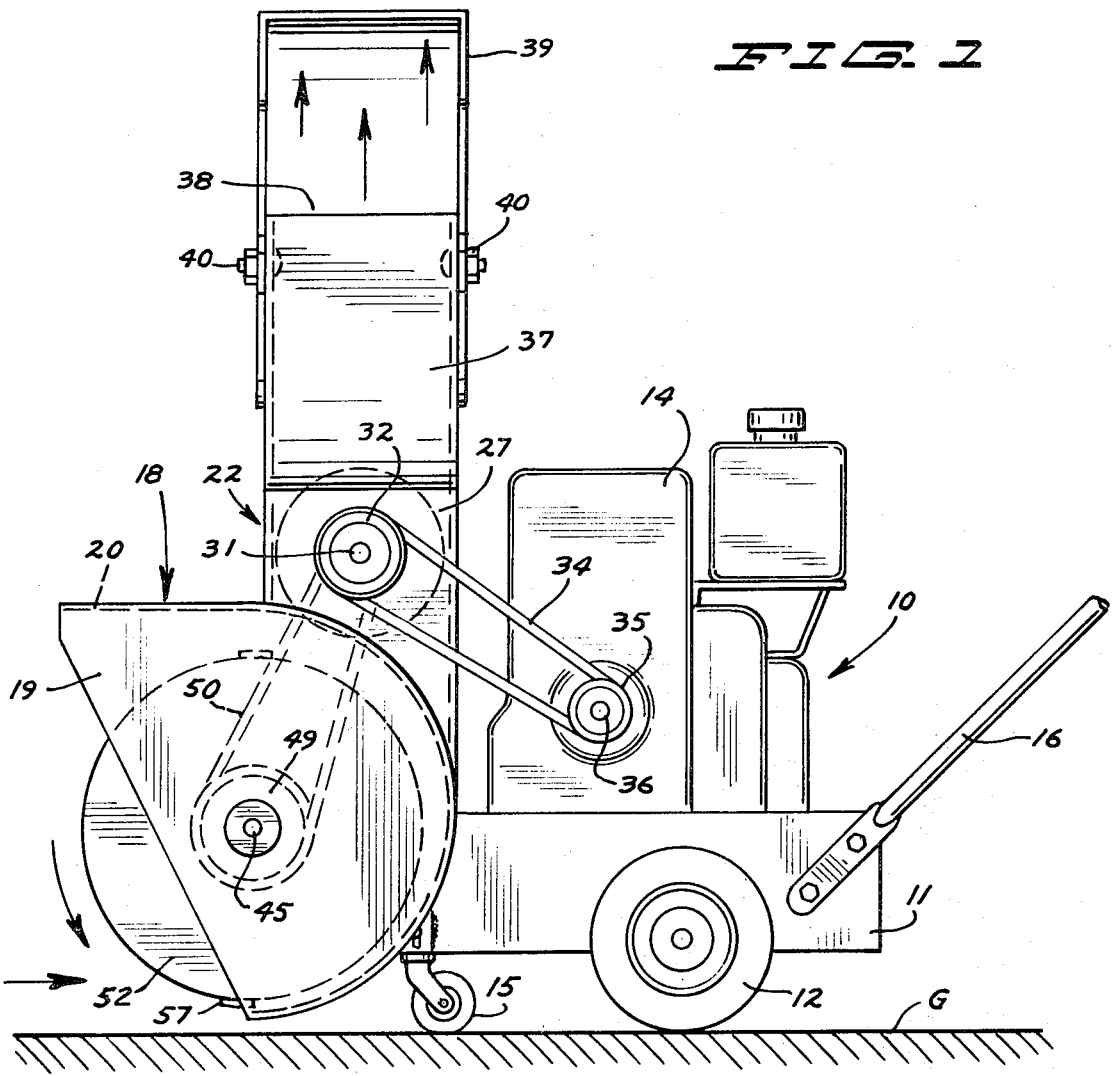
FIG. 1 is a side elevation of a combination lawn mowing and snow blowing machine embodying the present invention.

Referring now more particularly to the drawings reference characters will be used to denote like parts or structural features in the different views. The machine, denoted generally by the numeral 10, has a chassis 11 supported upon a pair of axially aligned ground wheels 12 which may be driven by a suitable drive connection with engine 14 mounted on the chassis. A pair of castor wheels 15 are mounted on the chassis forward of wheels 12 for vertical adjustment of the front end of the chassis relative to the ground surface G. A handle 16 extends rearwardly from the chassis 11 for manual control of the machine over the ground surface.

A forwardly opening impeller housing or hood 18 is mounted on the front end of chassis 11. This housing has a pair of end walls 19 connected by a top wall 20 and a rear wall 21, respectively extending crosswise between the upper and the lower rear edges of plates 19. A beater housing 22 is mounted on the top of impeller housing 18 and opens downwardly thereinto across the entire width of housing 18. Accordingly, top wall 20 extends rearwardly to housing 22 and the rear wall 21 extends downwardly from housing 22.

A beater denoted generally at 24 is mounted for rotation within the housing 22. This beater includes a shaft 25 disposed in horizontal position with its end portions journaled in bearings 26 mounted in the housing side walls 27. Shaft 25 carries a pair of center beater blades 29 and a plurality of side beater blades 30 the latter of which have their leading surfaces during rotation sloping inwardly to direct material engaged thereby toward the center of housing 22.

Shaft 25 has a portion 31 extending beyond one side wall 27 to carry pulley 32 having a driven connection through belt 34 with pulley 35 mounted on drive shaft 36 of engine 14.

The side walls of housing 22 above the walls 27 angle inwardly as at 37 to a discharge opening 38 at the top of the housing. A discharge hood 39 is mounted on the housing 22 by pivot bolts 40 allowing the hood to be manually tilted by handle 41 from one side to the other to selectively direct material being discharged upwardly through opening 38 in either lateral direction.

A rotary impeller for cutting through materials on the ground surface such as grass or snow and directing such materials rearwardly and upwardly into beater housing 22 is denoted generally by the number 44. This impeller includes a shaft 45 disposed horizontally crosswise within the housing 18 with its end portions journaled in bearings 46 mounted in the side walls 19. A closure 47 at one side of housing 18 and extending upwardly into beater housing 22 encloses sprockets 48 and 49 respectively keyed to shafts 25 and 45. A sprocket chain 50 is trained around sprockets 48 and 49 to provide a driving connection therebetween.

Figure 3:
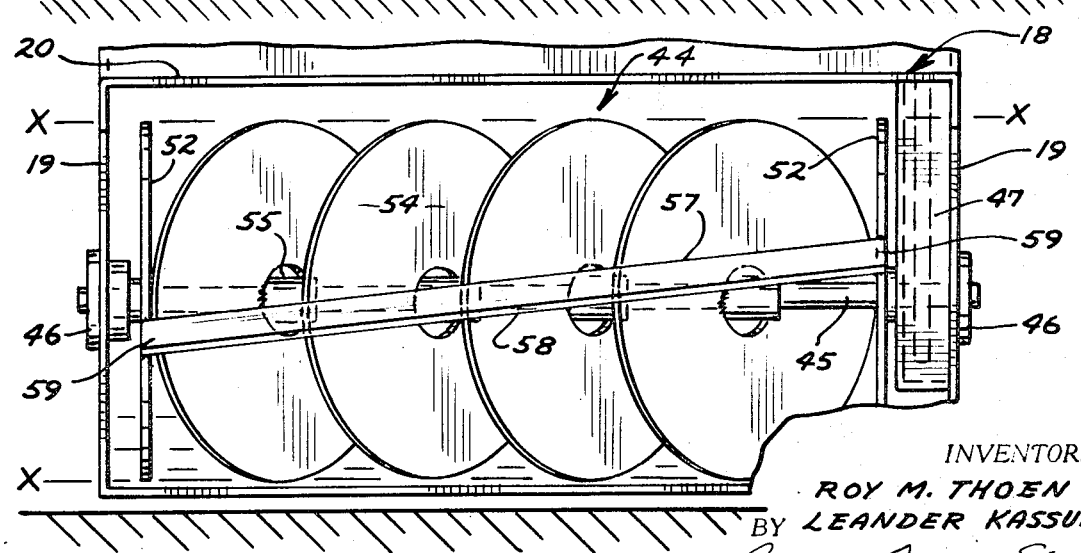
FIG. 3 is a front elevation of the impeller in "closed" position with the cutter bars horizontally spaced in fore and aft relation.
Figure 2:
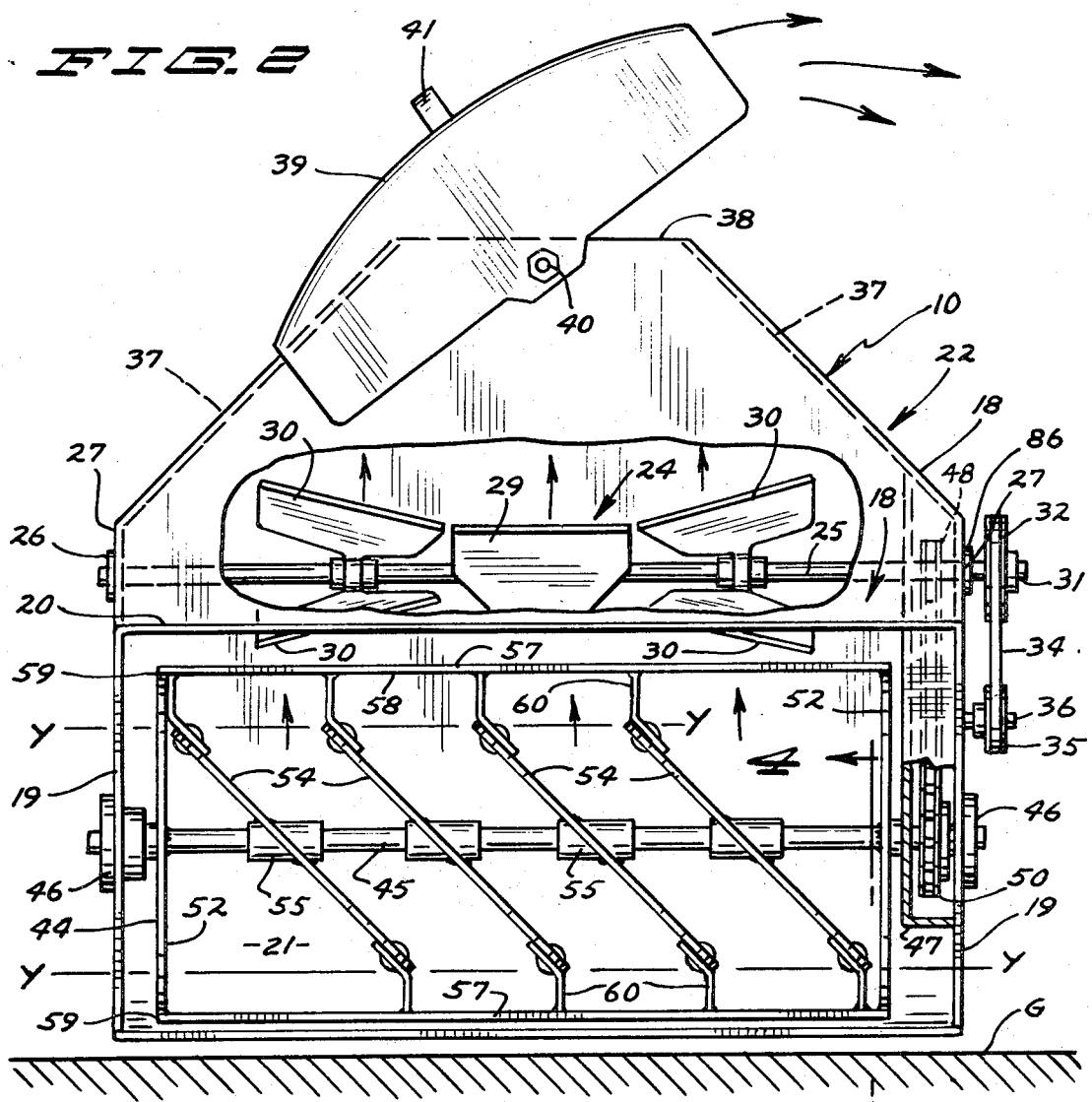
FIG. 2 is an enlarged front elevation of the machine with the rotary impeller in "open" position for the reception of material and the cutter bars vertically spaced. Portions of the structure are partially broken away to show the beater and the impeller drive chain.
Figure 4:
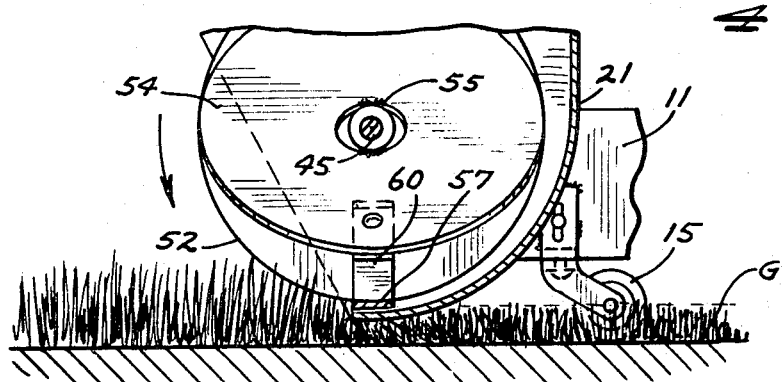
FIG. 4 is a partial vertical section through the impeller taken on line 4—4 of FIG. 2.

A pair of circular metal disks 52 are axially and integrally mounted in spaced relation on shaft 45 with the planes thereof parallel to each other and being disposed normal to the shaft axis. These disks 52 are mounted near opposite ends of the shaft portion disposed within the housing 18, as best seen in FIGS. 2 and 3, and serve as end plates of the impeller. A plurality of other circular disks 54 of the same diameter as disks 52 are axially mounted on shaft 45 as by means of sleeves 55 welded in the center of the disks. However, while the planes of these disks 54 are parallel to each other, they are disposed at a common acute angle to the axis of shaft 45 as shown in FIG. 2. The angle is preferably about 45°. Accordingly, each disk 54 extends diametrically along its axis of tilt to a line X—X drawn along the peripheries of disks 52 as shown in FIG. 3. However, it extends diametrically perpendicular to its axis of tilt only to line Y—Y, spaced more closely to the shaft, as shown in FIG. 2.

A pair of cutter bars 57 are mounted on diametrically opposite sides of the impeller. These are slightly tilted with respect to the axis of shaft 45, as shown in FIG. 2, for better cutting action. The leading edges 58 of bars 57 are sharpened and the ends of the bars are welded as at 59 to the peripheries of disks 52. The central portions of cutter bars 57 are supported by brackets 60 connected to the most tilted edge portions of disks 54.

In operation the machine functions in substantially the same manner for either lawn mowing or snow removal. It is found that rotation of the impeller at approximately 800 rpm is satisfactory for either application. It will be noted from the arrow in FIG. 1 that the impeller 44 and beater 24 are both driven in a forward direction, that is, counterclockwise, when the machine is viewed from the left. When the impeller is in the position of FIGS. 1 and 2 with the cutter bars 57 vertically spaced, and immediately before reaching said position, the lower cutter bar is performing a cutting action through the grass or snow disposed above ground surface G. In this position the impeller is open (FIG. 2) allowing free passage of material into housing 18. During the next quarter revolution of the impeller it moves to the closed position shown in FIG. 2 with the disks 54 moving material rearwardly under the shaft 45. There will, of course, also be some lateral movement of the material by disks 54 due to their auger like action. After one-half of a revolution the impeller will again be brought to the open condition similar to FIG. 2 but with disks 54 being tilted in the opposite direction due to the wobble plate construction. Accordingly, during the next half a revolution the disks will move the material rearwardly and laterally in the opposite direction with the opposite sides of the disks working on the material.

Due to the rapid rotation of the impeller the material cut by cutter bars 57 will move in a steady and rapid stream under shaft 45 and upwardly along the front side of the housing wall 21 into the beater housing 22 where it is engaged by the beater 24 and directed outwardly through opening 38 and deflected in the desired direction by shield 39.

The combination of the cutter blades 57 and the tilted disks 54 keeps the material, whether it be snow or grass, continually moving through the housings 18 and 22 as the impeller rotates between its relatively open and closed conditions.

If desired a safety guard screen may be mounted to suspend from the front edge of wall 20. Chains may be applied to ground wheels 12 for added traction on icy ground surfaces. The positioning of all ground wheels behind the impeller and within the lateral limits thereof also aids traction and the appearance of lawns mowed by the machine.

Having now therefore fully illustrated and described our invention, what we claim to be new and desire to protect by Letters Patent is:

1. In a combination lawn mowing and snow throwing machine,
   a. a chassis having ground wheels,
   b. a power source mounted on the chassis,
   c. an impeller mounted on the chassis for rotation on a horizontal axis,
   d. drive means connecting the power source to the impeller to rotate the impeller,
   e. said impeller including a plurality of feeding disks axially and fixedly mounted on a shaft in spaced relation therealong for rotation therewith,
   f. the planes of said disks being disposed at a common acute angle with respect to the shaft axis whereby horizontally aligned points on the peripheries thereof on diametrically opposed sides of the disks are closer to the shaft axis than other of said points,
   g. and a pair of cutter bars mounted on the impeller in diametrically opposed relation to extend along the outside of the feeding disks adjacent to said edges closest to the shaft and radially spaced from the shaft a distance substantially equal to the disk edges spaced farthest from the shaft.

2. The subject matter of claim 1 wherein all of said disks are disposed to lie on equally spaced parallel planes.

3. The subject matter of claim 1 wherein a pair of end disks are axially mounted on the shaft one on either side of the feeding discs, said end disks being of the same diameter as the feeding disks but lying on planes normal to the shaft axis.

4. The subject matter of claim 1 wherein said impeller is journaled within a forwardly opening housing mounted on the chassis, said housing having open communication with a beater mechanism adapted to receive material from the impeller and deliver it to a discharge opening.

5. The subject matter of claim 1 wherein the cutter bars are disposed at an angle to the axis of the impeller shaft.

6. The subject matter of claim 1 wherein the impeller is mounted on the forward end of the chassis relative to the direction of travel of the machine, and all of the chassis ground wheels being disposed rearwardly of the impeller and within the lateral limits thereof.

* * * * *